United States Patent Office 2,978,413
Patented Apr. 4, 1961

2,978,413

LUBRICATING OILS THICKENED TO A GREASE CONSISTENCY WITH CUPROUS N,N'-DIARYL-AMIDINE COMPOUNDS

Norman R. Odell, Fishkill, and Joseph F. Lyons, Poughkeepsie, N.Y., assignors to Texaco Inc., a corporation of Delaware No Drawing. Filed Dec. 19, 1958, Ser. No. 781,489

7 Claims. (Cl. 252—49.6)

This invention relates to greases having improved lubricating properties and to a novel class of thickening agents therefor. More particularly, it relates to greases thickened with copper derivatives of amidine compounds.

The compounds which are employed as grease thickening agents in accordance with this invention are derivatives of compounds containing one or more diaryl substituted amidine groups in the molecule. These compounds are represented by the formula

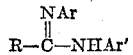

wherein R is hydrogen or a hydrocarbon group, which may be an aliphatic, cycloaliphatic or aromatic group, and Ar and Ar' are aromatic groups, which may be the same or different. Ar and Ar' may contain substituents of various types, preferably substantially neutral non-salt forming groups, such as, for example, alkyl, aryl, alkaryl, aralkyl, ether, ester, aldehyde, amino, hydroxy, nitro groups and halogens. Hydrocarbon groups represented by R may also contain substituents of these types as well as additional amidine groups, which are preferably aromatic substituted amidine groups. The preferred compounds are those wherein R is hydrogen or a lower alkyl group, containing up to about 6 carbon atoms, which may contain a diaryl substituted amidine group.

The copper derivatives of these compounds which are employed as grease thickening agents in accordance with this invention comprise amidine groups as shown above and monovalent copper atoms in a ratio of about 1:1. While the structure of these compounds is not definitely known, they are believed to be coordination compounds having linear nitrogen-metal bonds, as shown by the following structural formula:

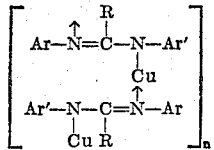

where $n$ is an integer from 1 to about 3, preferably about 2. The preferred compounds of this class are those wherein R is hydrogen and Ar and Ar' are phenyl or naphthyl groups, which may be either unsubstituted or contain substituent groups of various types as discussed above. Particularly suitable compounds include the following: cuprous N,N'-diphenylformamidine; cuprous N,N'-dinaphthylformamidine; cuprous N,N'-di-(p-nitrophenyl)formamidine; cuprous N,N'-di-(p-aminophenyl)formamidine; cuprous N,N'-di-(p-carbethoxyphenyl)formamidine; cuprous N,N-di(p-chlorophenyl)formamidine; and cuprous N,N'-di(p-4'-aminobiphenyl)formamidine.

Additional examples of suitable compounds of the above class which may be mentioned are: cuprous N,N'-di-1-naphthylpropionamidine; cuprous N,N'-diphenylbenzamidine; cuprous N,N'-di-p-chlorophenylacetamidine; cuprous N,N'-diphenylpropionamidine; cuprous N,N',N''-N'''-tetraphenyladipamidine; cuprous N,N-di-p-nitrophenylpropionamidine; cuprous N,N'-di-p-carbethoxyphenylacetamidine; cuprous N,N'-di-p-ethoxyphenyl-β-ethoxypropionamidine; cuprous N,N'-di-m,p-dimethylphenylformamidine; cuprous N,N',N'',N'''-tetra-p-chlorophenyladipamidine; and cuprous N,N'-di-2-anthraquinonylformamidine.

The above polymeric compounds are obtained, for example, by heating the amidine compounds with a copper salt such as cuprous chloride in pyridine solution. The amidine compounds are obtained by well-known methods such as by reacting together a primary arylamine with an orthoaldehyde at mildly elevated temperatures. They may also be obtained as described in U.S. 2,364,593 by reacting a primary arylamine with an acyldicyanodiamide in the presence of an acid.

The greases of this invention comprise essentially lubricating oils containing amidine derivatives of the class described above in sufficient amounts to impart at least substantial thickening. Ordinarily the composition will contain from about 5 to about 45 percent by weight of the amidine compound, and preferably about 15 to about 35 percent by weight of such compound, based on the weight of the composition.

The grease preparation may be carried out by merely mixing together the thickener and any additives employed with the lubricating oil, employing any convenient means to obtain a thorough dispersion of the thickener and additives in the lubricating oil base. The mixing may be carried out at ordinary temperatures or at elevated temperatures up to about 300° F. if desired in order to dissolve difficultly soluble additives.

The lubricating oils employed may be any suitable oils of lubricating characteristics, including the conventional mineral lubricating oils, synthetic oils obtained by various refinery processes, such as cracking and polymerization, and other synthetic oleaginous compounds. Suitable mineral oils include paraffinic and naphthenic oils having viscosities in the range from about 80 seconds Saybolt Universal at 100° F. to about 225 seconds Saybolt Universal at 210° F. and preferably those having viscosities in the range from about 100 to about 600 seconds Saybolt Universal at 100° F. For preparing high temperature greases, synthetic oils of various types, including particularly silicone oils and polyesters are preferably employed. Such oils may very advantageously comprise from about 50 up to 100 percent of the oil component of the grease, the remainder being mineral oil or other oil of a different type.

A particularly suitable class of synthetic polyester oils are those disclosed by R. T. Sanderson in U.S. 2,628,974, obtained by reacting dibasic aliphatic acids with glycols and end-blocking the reaction products with monohydric aliphatic alcohols or monocarboxylic aliphatic acids. The preferred materials of this character are products obtained by reacting mono- or polyalkylene glycols with dicarboxylic acids and monohydric alcohols, represented by the formula $R_2$—OOC—$R_1$—COO—(R—OOC—$R_1$—COO)$_x$—$R_2$ wherein R is an aliphatic hydrocarbon or an aliphatic ether group containing from 4 to 12 carbon atoms, $R_1$ and $R_2$ are aliphatic hydrocarbon groups containing from 1 to 12 carbon atoms and $x$ is an integer from 1 to 5.

The silicone oils are compounds having the general formula

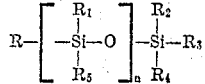

wherein R, $R_1$, $R_2$, $R_3$, $R_4$ and $R_5$ represent alkyl, aryl, alkaryl or aralkyl groups, which may be the same or different, and $n$ is a number sufficient to give a viscosity in the lubricating oil range to the compound, preferably a viscosity in about the range from about 100 to 600 seconds Saybolt Universal at 100° F. Suitable compounds of this type include dimethylsilicone polymer, diethylsilicone polymer, methylcyclohexylsilicone polymer, diphenylsilicone polymer, methylphenylsilicone polymer, methylethylsilicone polymer, methyltolylsilicone polymer, etc. These materials may be prepared by various methods, including hydrolysis of hydrolyzable organic-substituted silanes, as described for example in U.S. 2,410,346 and U.S. 2,469,888. The preferred silicone oils are methylchlorophenyl silicones, wherein the organic groups are methyl and phenyl groups, including chlorinated phenyl groups and containing at least about 3 percent by weight of chlorine. A particularly suitable material of this character is the commercial product sold by the General Electric Company under the trade name of Versilube F-50, which has a viscosity of about 180 to 250 seconds Saybolt Universal at 100° F. and contains about 5-10 percent by weight of chlorine.

Additives of the usual types may be employed in these greases, such as, for example, oxidation inhibitors, corrosion inhibitors, tackiness agents, extreme pressure agents, etc. Suitable oxidation inhibitors include particularly those of the amine type, such as diphenylamine, α-naphthyamine, β-naphthylamine, p-phenylenediamine and N,N'-diphenyl-p-phenylenediamine. Compounds of this type may very advantageously be present in amounts from about 0.05 to about 5 percent by weight, based on the weight of the composition. Also, the composition may contain minor amounts of additional thickening agents, such as other finely divided solids of various types and metal soaps of high molecular weight fatty acids, conventionally employed in lubricating greases.

The following examples describe representative greases prepared in accordance with this invention:

EXAMPLE I

A lubricating grease having the following composition in percent by weight:

Cuprous N,N'-diphenylformamidine ------------ 33.3
Mineral lubricating oil ---------------------- 66.7

The cuprous N,N'-diphenyl-formamidine employed in the above composition was the tetrameric compound, obtained as described by W. Bradley and I. Wright, Journal of the Chemical Society, pp. 640–48 (1956). The method in detail was as follows: N,N'-diphenylformamidine was prepared by heating together under reflux 232.5 grams of aniline and 148 grams of triethylorthoformate. The product thus obtained had a melting point, absolute, of 141° C. (uncorrected). It was converted to the cuprous derivative in the following manner: A solution of 18.6 grams of cuprous chloride in 150 milliliters of pyridine, under nitrogen, was mixed with 18.0 grams of the N,N'-diphenylformamidine in 40 milliliters of pyridine, 56.6 milliliters of 1.66 normal methanolic potassium hydroxide added with stirring and the mixture added to 2055 milliliters of 0.65 percent ammonium hydroxide solution. The precipitate formed was filtered off and the filter cake washed with water, boiled with alcohol, filtered hot and dried. The product obtained was in the form of fine white needles, having a melting point above 300° C., and contained 28.2 percent by weight of copper, by analysis.

The mineral lubricating oil employed was a refined naphthenic distillate fraction having a Saybolt Universal viscosity at 100° F. of about 315 seconds.

The grease preparation was carried out by mixing together the thickener and lubricating oil in the indicated proportions by weight, employing an electric mixer.

A smooth N.L.G.I. No. 1 grade grease was obtained as described above, having a dropping point above 500° F. and good shear stability, as shown by the following test:

*Shear stability, ASTM worker test*

ASTM penetration at 77° F.:
    Unworked --------------------------------- 324
    Worked, 60 strokes ----------------------- 345
    Worked, 100,000 strokes ------------------ 385

EXAMPLE II

A lubricating grease having the following composition in percent by weight:

Cuprous N,N'-di-(p-nitrophenyl)formamidine ----- 30.0
Diphenylparaphenylenediamine ------------------ 1.0
Formamide ------------------------------------ 1.0
Polyester oil --------------------------------- 68.0

The cuprous N,N'-di-(p-nitrophenyl) formamidine was the tetrameric compound, obtained as described in Example I except that p-nitroaniline was employed in the reaction in place of aniline. The product was a greenish yellow powder, melting above 300° C., containing 24.9 percent by weight of copper by analysis.

The polyester oil employed was a product obtained by reacting sebacic acid, 2-ethylhexane-1,3-diol and 2-ethylhexanol in about a 2:1:2 ratio respectively, and consisting predominantly of the compound $$(\text{iso-}C_8H_{17})\text{—OOC—}(CH_2)_8\text{—COO-iso-}C_8H_{16}$$
$$\text{—OOC—}(CH_2)_8\text{—COO-(iso-}C_8H_{17})$$

The grease preparation was carried out as described in Example I, employing the above materials in the indicated proportions by weight.

A smooth N.L.G.I. No. 0 grade grease was obtained as described above having a dropping point point above 500° F.

EXAMPLE III

A lubricating grease having the following composition in percent by weight:

Cuprous N,N'-di-(p-nitrophenyl)formamidine ------ 30
Silicone oil ---------------------------------- 70

The cuprous N,N'-di-(p-nitrophenyl)formamidine was obtained as described in Example III. The silicone oil was Versilube F-50, having a molecular weight of 3,233, a specific gravity at 20° C./4 of 1.03, a flash point of 575° F., a fire point of 650° F. and containing 33.6 percent by weight of silicon and 7.18 percent by weight of chlorine by analysis.

The grease preparation was carried out as described in Example I, employing the above materials in the indicated proportions by weight.

A smooth N.L.G.I. No. 0 grade grease was obtained as described above having a dropping point of 436° F.

EXAMPLE IV

A lubricating grease having the following composition in percent by weight:

Cuprous N,N'-di-(p-carbethoxyphenyl)formamidine_ 25
Silicone oil----------------------------------- 75

The cuprous N,N'-di-(p-carbethoxyphenyl)formamidine was the tetrameric compound, obtained as described in Example I except that p-carbethoxyaniline was employed in the reaction instead of aniline. The product was in the form of long dark colored crystals, melting above 300° C., and contained 16.8 percent by weight of copper by analysis.

The silicone oil employed was Versilube F-50, as described in Example IV. The grease preparation was carried out as described in Example I.

A smooth N.L.G.I. No. 2 grade grease was obtained as described above, having a dropping point of 561° F. Micrographs show that the thickener is present in this grease in the form of fibers the major portion of which are about 3–6 microns in length, resulting from a breaking up of the very long fibers of the original precipitate in the mixing process.

Greases prepared as described in the above examples possessed a combination of desirable lubricating properties not obtainable in conventional soap thickened greases or in the conventional solids thickened greases, containing inorganic finely divided solids such as silica gel as the thickening agent. Table I below shows, for example, the oxidation stability at elevated temperatures and water resistance properties of these greases, as determined by standard tests.

TABLE I

| Grease, Example No. | II | III | IV |
|---|---|---|---|
| ASTM Bomb Oxidation Test (100 hrs., 210° F.) Pressure drop, lbs. | 6;6 | 3;3 | 0;0 |
| Dynamic Water Resistance, percent loss | 0;0 | 0;2.5 | 0;2.5 |
| Water Absorption Test, percent absorbed | 80 | 60 | 30 |
| Pen. before test (¼ cone) | 347 | 388 | 264 |
| Pen. after test | 305 | 350 | 313 |

As shown by the data given in the above table, the greases representative of the greases of this invention had very good oxidation resistance, the greases of Examples III and IV being very outstanding in this respect for uninhibited greases, and in addition they had excellent water resistance properties. They were very resistant to washing away by the action of water, differently, for example, from silica thickened greases which ordinarily show a 100 percent loss in the Dynamic Water Resistance Test. They also rejected water at below 100 percent absorption, which is a desired characteristic for certain purposes, and showed only a moderate amount of change in grease consistency after water absorption.

The following table also shows the high temperature performance properties of one of these greases as determined in the High Temperature Performance Test run at 700° F.

TABLE II

| Grease, Example No. | High Temperature Performance Test Hours at 700° F. |
|---|---|
| III | 7 |

The High Temperature Performance Test is a test for determining the stability and lubricating properties of greases at elevated temperatures and at high rotative speeds. It is carried out as described, for example, in U.S. 2,639,266, col. 7, line 42–col. 8, line 34, employing a test apparatus which comprises a steel spindle supported on ball bearings lubricated with the lubricant under test in an electrically heated housing. The test is carried out by rotating the spindle at 10,000 r.p.m. at the test temperature until the lubricant fails, which is indicated by rupture of a low amperage fuse in the motor circuit. As shown by Table II, the grease of Example III ran for a substantial length of time in this test at the extremely high temperature of 700° F.

Obviously many modifications and variations of the invention, as hereinbefore set forth, may be made without departing from the spirit and scope thereof and only such limitations should be imposed as are indicated in the appended claims.

We claim:
1. A lubricating grease consisting essentially of a lubricating oil thickened to a grease consistency with a cuprous derivative of an amidine compound represented by the formula

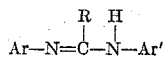

wherein R is chosen from the group consisting of hydrogen and lower alkyl groups containing from 1 to 6 carbon atoms, and Ar and Ar' are chosen from the group consisting of phenyl and naphthyl groups and substituted phenyl and naphthyl groups.

2. A lubricating grease composition according to claim 1 wherein the said lubricating oil comprises in major proportion at least a dicarboxylic acid polyester.

3. A lubricating grease composition according to claim 1 wherein the said lubricating oil comprises in major proportion at least a silicon oil.

4. A lubricating grease composition according to claim 1 wherein the said amidine compound is N,N'-diphenylformamidine.

5. A lubricating grease composition according to claim 1 wherein the said amidine compound is N,N'-di-(p-nitrophenyl)formamidine.

6. A lubricating grease composition according to claim 1 wherein the said amidine compound is N,N'-di-(p-carbethoxyphenyl)formamidine.

7. A lubricating grease consisting essentially of a lubricating oil thickened to a grease consistency by means of a compound of the class consisting of tetrameric cuprous N,N'-diphenylformamidine compounds and substituted derivatives thereof.

References Cited in the file of this patent

UNITED STATES PATENTS

| | | |
|---|---|---|
| 2,597,018 | Merker et al. | May 20, 1952 |
| 2,679,480 | Brannen et al. | May 25, 1954 |
| 2,848,417 | Armstrong et al. | Aug. 19, 1958 |
| 2,880,177 | Lyons et al. | Mar. 31, 1959 |